United States Patent
Wooldridge et al.

(10) Patent No.: US 10,668,748 B2
(45) Date of Patent: Jun. 2, 2020

(54) CARD PROCESSING SYSTEM WITH ADAPTABLE CARD TRANSPORT DELAY

(71) Applicant: ENTRUST DATACARD CORPORATION, Shakopee, MN (US)

(72) Inventors: Cory D. Wooldridge, Shakopee, MN (US); Timothy J. Flitsch, Shakopee, MN (US); Jon Wawra, Shakopee, MN (US)

(73) Assignee: ENTRUST DATACARD CORPORATION, Shakopee, MN (US)

( * ) Notice: Subject to any disclaimer, the term of this patent is extended or adjusted under 35 U.S.C. 154(b) by 0 days.

(21) Appl. No.: 15/974,230

(22) Filed: May 8, 2018

(65) Prior Publication Data

US 2018/0326761 A1 Nov. 15, 2018

Related U.S. Application Data

(60) Provisional application No. 62/503,643, filed on May 9, 2017.

(51) Int. Cl.
*B41J 13/12* (2006.01)
*B41J 13/00* (2006.01)
(Continued)

(52) U.S. Cl.
CPC ......... *B41J 13/0009* (2013.01); *B41J 11/002* (2013.01); *B41J 13/12* (2013.01); *B65H 5/06* (2013.01); *G06K 13/07* (2013.01); *G06K 13/077* (2013.01); *B41M 5/0047* (2013.01); *B41M 5/0064* (2013.01); *B41M 7/0081* (2013.01); *B65H 2701/1914* (2013.01)

(58) Field of Classification Search
CPC ...... B41J 11/002; B41J 13/12; B41J 13/0009; B65H 5/06; G06K 13/07
See application file for complete search history.

(56) References Cited

U.S. PATENT DOCUMENTS

| | | |
|---|---|---|
| 4,995,501 A | 2/1991 | Lundstrom et al. |
| 5,266,781 A | 11/1993 | Warwick et al. |

(Continued)

FOREIGN PATENT DOCUMENTS

WO   2017007327 A1   1/2017

OTHER PUBLICATIONS

International Search Report and Written Opinion issued in PCT/US2018/031616 dated Aug. 27, 2018, 16 pages.

*Primary Examiner* — Lamson D Nguyen
(74) *Attorney, Agent, or Firm* — Hamre, Schumann, Mueller & Larson, P.C.

(57) ABSTRACT

Systems and methods where a delay time between a first card processing mechanism, such as a drop-on-demand printer that prints with UV curable ink, and a second card processing mechanism, such as a UV curing station, can be altered to adjust the travel time of the card from the first card processing mechanism to the second card processing mechanism. First and second card buffers can be provided between the first card processing mechanism and the second card processing mechanism. Each of the first and second card buffers is independently logically controlled to permit independent control of the transport time of a card through each card buffer. Alternatively, a single card buffer or more than two card buffers can be provided between the first card processing mechanism and the second card processing mechanism.

12 Claims, 5 Drawing Sheets

(51) Int. Cl.

| | |
|---|---|
| *B41J 11/00* | (2006.01) |
| *B65H 5/06* | (2006.01) |
| *G06K 13/07* | (2006.01) |
| *G06K 13/077* | (2006.01) |
| B41M 5/00 | (2006.01) |
| B41M 7/00 | (2006.01) |

(56) References Cited

U.S. PATENT DOCUMENTS

| | | |
|---|---|---|
| 5,451,037 A | 9/1995 | Lundstrom |
| 5,588,763 A | 12/1996 | Nubson et al. |
| 5,837,991 A | 11/1998 | La Manna et al. |
| 5,980,011 A | 11/1999 | Cummins et al. |
| 6,131,817 A | 10/2000 | Miller |
| 6,902,107 B2 | 6/2005 | Shay et al. |
| 9,098,780 B1 | 8/2015 | Bayer |
| 2004/0066441 A1 | 4/2004 | Jones et al. |
| 2007/0187870 A1 | 8/2007 | Lundstrom et al. |
| 2014/0063086 A1 | 3/2014 | Morgavi |
| 2016/0325567 A1 | 11/2016 | Beech et al. |

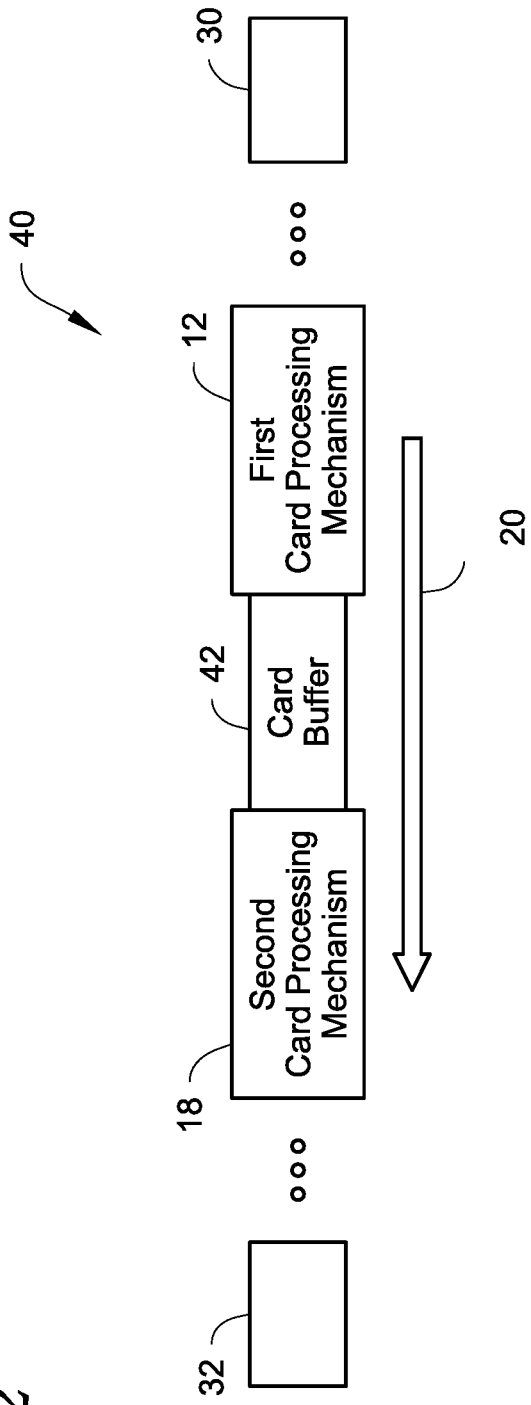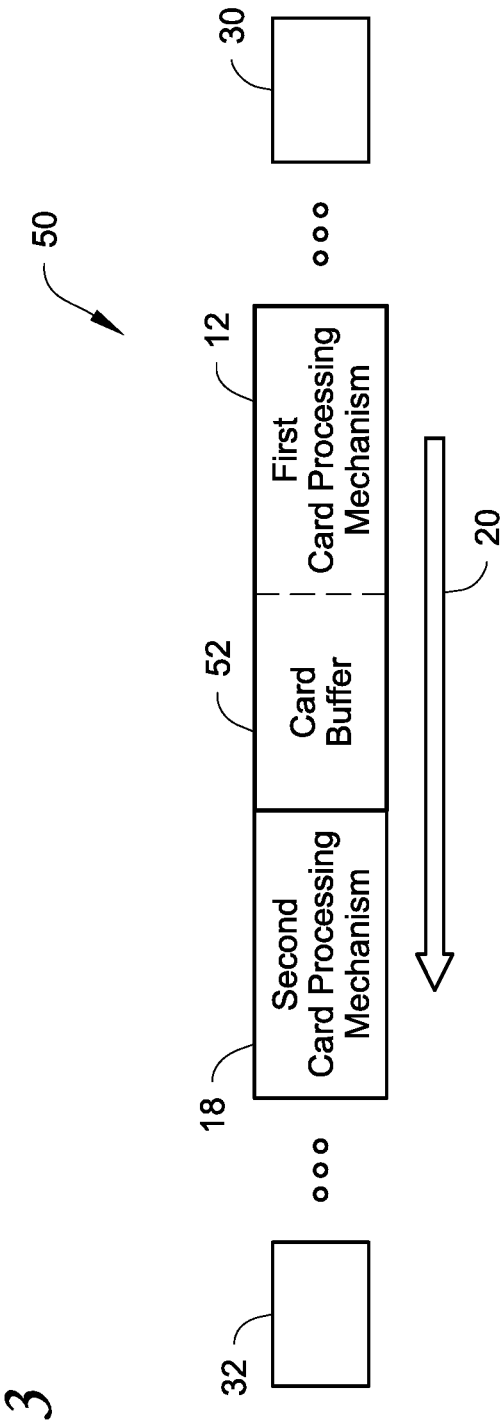

CARD PROCESSING SYSTEM WITH ADAPTABLE CARD TRANSPORT DELAY

FIELD

This disclosure relates to card processing systems that process plastic cards including, but not limited to, financial (e.g., credit, debit, or the like) cards, driver's licenses, national identification cards, business identification cards, gift cards, and other plastic cards, and to transporting cards in such card processing systems.

BACKGROUND

The use of drop-on-demand (DOD) inkjet printing using ultra-violet (UV) curable ink to print on plastic cards is known. After printing, the ink needs to be cured by exposure to UV light. The time from print to cure, referred to as the cure delay time, will have a major effect on the resulting print quality and ink behavior. The cure delay time, which normally ranges anywhere from 0.5 to 2.00 seconds, can vary depending on the surface energy of the media or substrate the UV curable ink is applied to, ink surface energy, and ink type. Common practice in the plastic card printing industry is to adjust the distance between the print head(s) and the UV curing station to achieve the optimum cure delay time.

SUMMARY

Systems and methods are described where a delay time between a first card processing mechanism and a second card processing mechanism can be altered to adjust the travel time of the card from the first card processing mechanism to the second card processing mechanism. In one embodiment, first and second card buffers are provided between the first card processing mechanism and the second card processing mechanism. Each of the first and second card buffers has a card transport mechanism defining a card transport path. The transport paths are colinear with each other and colinear with the card transport paths of the first card processing mechanism and the second card processing mechanism. Each of the first and second card buffers is independently logically controlled to permit independent control of the transport time of a card through each card buffer. In other embodiments, a single card buffer or more than two card buffers can be provided between the first card processing mechanism and the second card processing mechanism.

The first and second card processing mechanisms described herein can be any card processing mechanisms where it may be desired to adjustably control the card transport times from the first card processing mechanism to the second card processing mechanism without having to mechanically adjust the physical distance between the two card processing mechanisms each time that the card transport time needs to be modified. In one embodiment, the first card processing mechanism is a DOD inkjet printer that prints using UV curable ink, and the second card processing mechanism is a UV curing station that contains a UV lamp for curing the UV curable ink. In this embodiment, the cure delay time (i.e. the time between completion of printing using the UV curable ink and when the card reaches the UV curing station) can be controlled by suitable control of the transport mechanisms of the first and second card buffers. This eliminates the need to mechanically adjust the distance between the printer and the UV curing station when the cure delay time needs to be adjusted.

However, the first and second card processing mechanisms can be other mechanisms that can perform processing operations on the cards. For example, the first and second card processing mechanisms can be any combination of at least two of: a printer, an embosser, an indenter, a magnetic stripe read/write head(s), an integrated circuit chip programmer, a laser that performs laser processing such as laser marking on the cards, a laminator that applies a laminate to a portion of or the entire surface of the cards, a topcoat station that applies a topcoat to a portion of or the entire surface of the cards, a quality control station that checks the quality of the personalization/processing applied to the cards, a security station that applies a security feature, such as a holographic foil patch, to the cards, and other card processing mechanisms.

The cards described herein include, but are not limited to, plastic cards which bear personalized data unique to the intended cardholder and/or which bear other card information. Examples of plastic cards can include, but are not limited to, financial (e.g., credit, debit, or the like) cards, driver's licenses, national identification cards, business identification cards, gift cards, and other plastic cards.

DRAWINGS

FIG. 2 is a schematic depiction of another embodiment of a card processing system described herein.

FIG. 3 is a schematic depiction of still another embodiment of a card processing system described herein.

DETAILED DESCRIPTION

Figure 1:
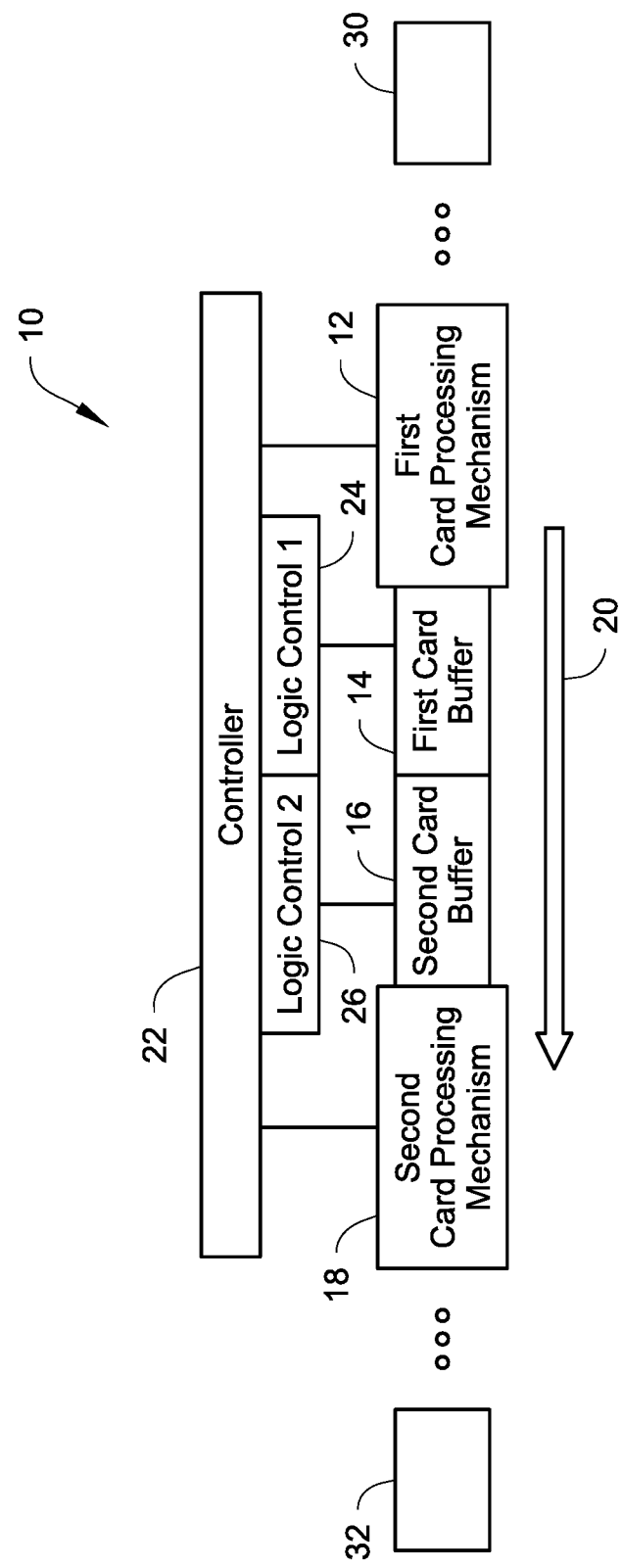
FIG. 1 is a schematic depiction of a card processing system described herein.
Figure 6:
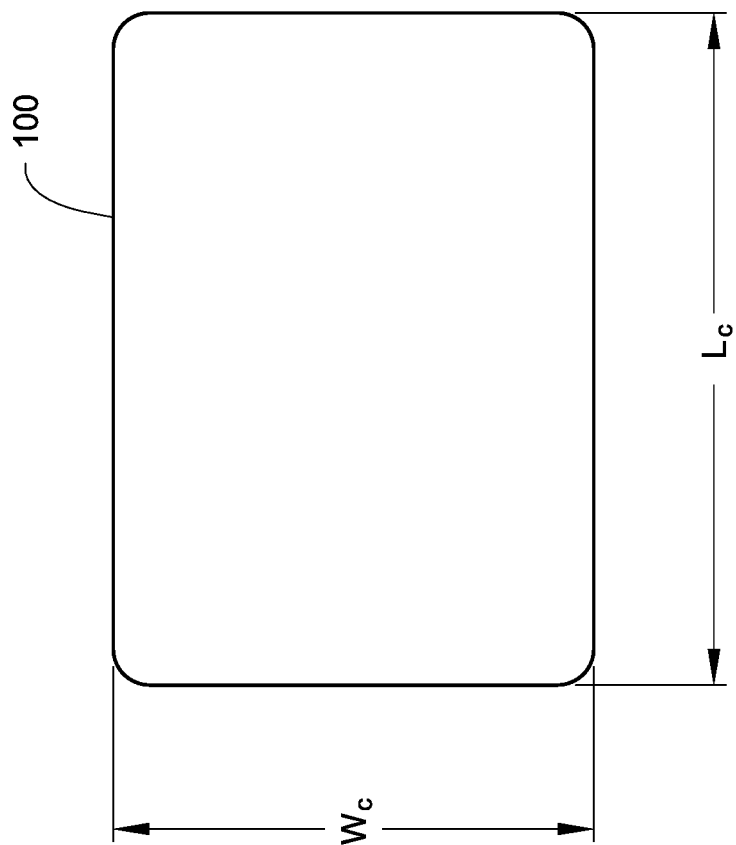
FIG. 6 is a top view of a plastic card.

FIG. 1 illustrates an example of a card processing system 10 that can utilize the systems and methods described herein. The card processing system 10 includes a first card processing mechanism 12, a first card buffer 14, a second card buffer 16, and a second card processing mechanism 18. A direction of card transport (or card flow) through the system 10 is illustrated by the arrow 20. The system 10 is designed to process plastic cards that are input into the system 10. The plastic cards described herein include, but are not limited to, plastic cards which bear personalized data unique to the intended cardholder and/or which bear other card information. Examples of plastic cards can include, but are not limited to, financial (e.g., credit, debit, or the like) cards, driver's licenses, national identification cards, business identification cards, gift cards, and other plastic cards. Referring to FIG. 6, in one embodiment, the plastic card can be an ID-1 card 100 as defined by ISO/IEC 7810, with a length $L_c$ of about 85.60 mm (about 3⅜ inches) and a width $W_c$ of about 53.98 mm (about 2⅛ inches), and four rounded corners each with a radius of between about 2.88-3.48 mm.

Returning to FIG. 1, the operations of the first and second card processing mechanisms 12, 18 are controlled by a suitable controller 22. Each of the card processing mechanisms 12, 18 includes a mechanical card transport mechanism that transports plastic cards through each processing mechanism 12, 18 in the card transport direction 20. The mechanical card transport mechanisms can have any suitable mechanical construction known in the art for transporting plastic cards, such as transport rollers and/or transport belts (with tabs and/or without tabs) and/or carriages and combinations thereof. Mechanical card transport mechanisms are well known in the art including those disclosed in U.S. Pat. Nos. 6,902,107, 5,837,991, 6,131,817, and 4,995,501 and U.S. Published Application No. 2007/0187870, each of which is incorporated herein by reference in its entirety. A person of ordinary skill in the art would readily understand the type(s) of card transport mechanisms that could be used, as well as the construction and operation of such card transport mechanisms.

Each of the first and second card buffers 14, 16 also includes a mechanical card transport mechanism. The mechanical card transport mechanisms of the card buffers 14, 16 can have any suitable construction known in the art for transporting plastic cards, such as transport rollers and/or transport belts, preferably by engaging the edges of the cards so that the transport mechanism does not contact the front or back surfaces of the cards. In one embodiment, each of the card buffers 14, 16 contains only a single card at any moment in time during operation. For example, as one card is input into the first card buffer 14, a second card is exiting the first card buffer 14 into the second card buffer 16 while a card that was in the second card buffer 16 is output into the second card processing mechanism 18.

The first and second card buffers 14, 16 are each configured to controllably transport the cards in the card transport direction 20. The card buffers 14, 16 do not contain any card processing capabilities and do not perform a processing operation on the cards. Rather, the card buffers 14, 16 can each be controlled to alter the transport times of the cards therethrough, thereby controlling the transport times of the cards from the first card processing mechanism 12 to the second card processing mechanism 18. Although the two card buffers 14, 16 are illustrated, more than two card buffers can be used or a single card buffer can be used.

Each card buffer 14, 16 is independently logically controlled whereby the transport mechanism of the card buffer 14 and its corresponding card transport time therethrough can be independently controlled from the transport mechanism and its corresponding card transport time of the card buffer 16, as well as controlled independently and separately from the transport mechanisms of the card processing mechanisms 12, 18. In particular, referring to FIG. 1, the first card buffer 14 can be controlled by a first logic control 24 and the second card buffer 16 can be controlled by a second logic control 26. The logic controls 24, 26 can both be control logic stored in suitable storage of the controller 22, or the logic controls 24, 26 can be stored in a controller separate from the controller 22. The logic controls 24, 26 can have any specific configuration and reside at any location so long as the transport mechanisms of the card buffers 14, 16 can be independently and separately controlled from one another, and independently and separately controlled from the processing mechanisms 12, 18. In one embodiment, a card can basically pass through one of or each of the card buffers 14, 16 without stopping. In another embodiment, a card can be temporarily stopped or "parked" in one of or each of the card buffers 14, 16 for a predetermined time period before being transported downstream.

The first and second card processing mechanisms 12, 18 described herein can be any card processing mechanisms where it may be desired to adjustably control the card transport times from the first card processing mechanism 12 to the second card processing mechanism 18 using a card buffer without having to mechanically adjust the physical distance between the two card processing mechanisms each time that the card transport time needs to be modified. For example, the first and second card processing mechanisms 12, 18 can be any combination of at least two of: a printer, an embosser, an indenter, a magnetic stripe read/write head(s), an integrated circuit chip programmer, a laser that performs laser processing such as laser marking on the cards, a laminator that applies a laminate to a portion of or the entire surface of the cards, a topcoat station that applies a topcoat to a portion of or the entire surface of the cards, a quality control station that checks the quality of the personalization/processing applied to the cards, a security station that applies a security feature, such as a holographic foil patch, to the cards, and other card processing mechanisms.

In one embodiment described further below with respect to FIG. 4, the first card processing mechanism 12 can be a DOD inkjet printer that prints using UV curable ink, and the second card processing mechanism 18 can be a UV curing station that contains a UV lamp for curing the UV curable ink that is applied to the plastic cards in the DOD inkjet printer. In this embodiment, the cure delay time (i.e. the time between completion of printing using the UV curable ink and when the card reaches the UV curing station) can be controlled by controlling the transport times of the cards as they are transported through the first and second card buffers 14, 16. This eliminates the need to mechanically adjust the distance between the printer and the UV curing station when the cure delay time needs to be adjusted.

As illustrated in FIG. 1, in some embodiments the system 10 can be used with one or more other card processing mechanisms (also referred to as card processing modules or card processing stations). For example, one or more additional card processing mechanisms 30 can be located upstream of the system 10. Examples of the upstream card processing mechanism(s) 30 can include, but are not limited to, one or more of a card input hopper containing cards to be processed, a printing system, an embossing system, an indenting system, a magnetic stripe reading/writing system, an integrated circuit chip programming system that can program a single card at any one time or can simultaneously program a plurality of cards, a laser system that performs laser processing such as laser marking on the cards, a laminating system that applies a laminate to a portion of or the entire surface of the cards, a topcoat system that applies a topcoat to a portion of or the entire surface of the cards, a security system that applies a security feature, such as a holographic foil patch, to the cards, and other systems known in the art.

One or more additional card processing mechanisms 32 can also be located downstream of the system 10. Examples of the downstream card processing mechanism(s) 32 can include, but are not limited to, one or more of a card output hopper containing cards that have been processed, a printing system, an embossing system, an indenting system, a magnetic stripe reading/writing system, an integrated circuit chip programming system that can program a single card at any one time or can simultaneously program a plurality of cards, a laser system that performs laser processing such as laser marking on the cards, a laminating system that applies a laminate to a portion of or the entire surface of the cards, a topcoat system that applies a topcoat to a portion of or the entire surface of the cards, a security system that applies a security feature, such as a holographic foil patch, to the cards, and other systems known in the art.

FIG. 2 illustrates another embodiment of a card processing system 40 that can utilize the systems and methods described herein. The card processing system 40 includes the first card processing mechanism 12, a card buffer 42, and the second card processing mechanism 18, and optionally the additional card processing mechanisms 30, 32. The card transport direction is illustrated by the arrow 20. In this embodiment, instead of using at least two card buffers as in FIG. 1, the single card buffer 42 is used. The card buffer 42 can have a construction and function identical to the card buffers 14, 16 in FIG. 1.

FIG. 3 illustrates another embodiment of a card processing system 50 that can utilize the systems and methods described herein. The card processing system 50 includes the first card processing mechanism 12, a card buffer 52, and the second card processing mechanism 18, and optionally the additional card processing mechanisms 30, 32. The card transport direction is illustrated by the arrow 20. In this embodiment, the single card buffer 52 is used, with the card buffer 52 being integrated into the first card processing mechanism 12. The card buffer 52 can have a construction and function identical to the card buffers 14, 16 in FIG. 1, with the card buffer 52 being independently and separately controlled from the first card processing mechanism 12. In another embodiment, rather than incorporating the card buffer 52 into the first card processing mechanism 12, the card buffer 52 can instead be incorporated into the second card processing mechanism 18.

Figure 4:
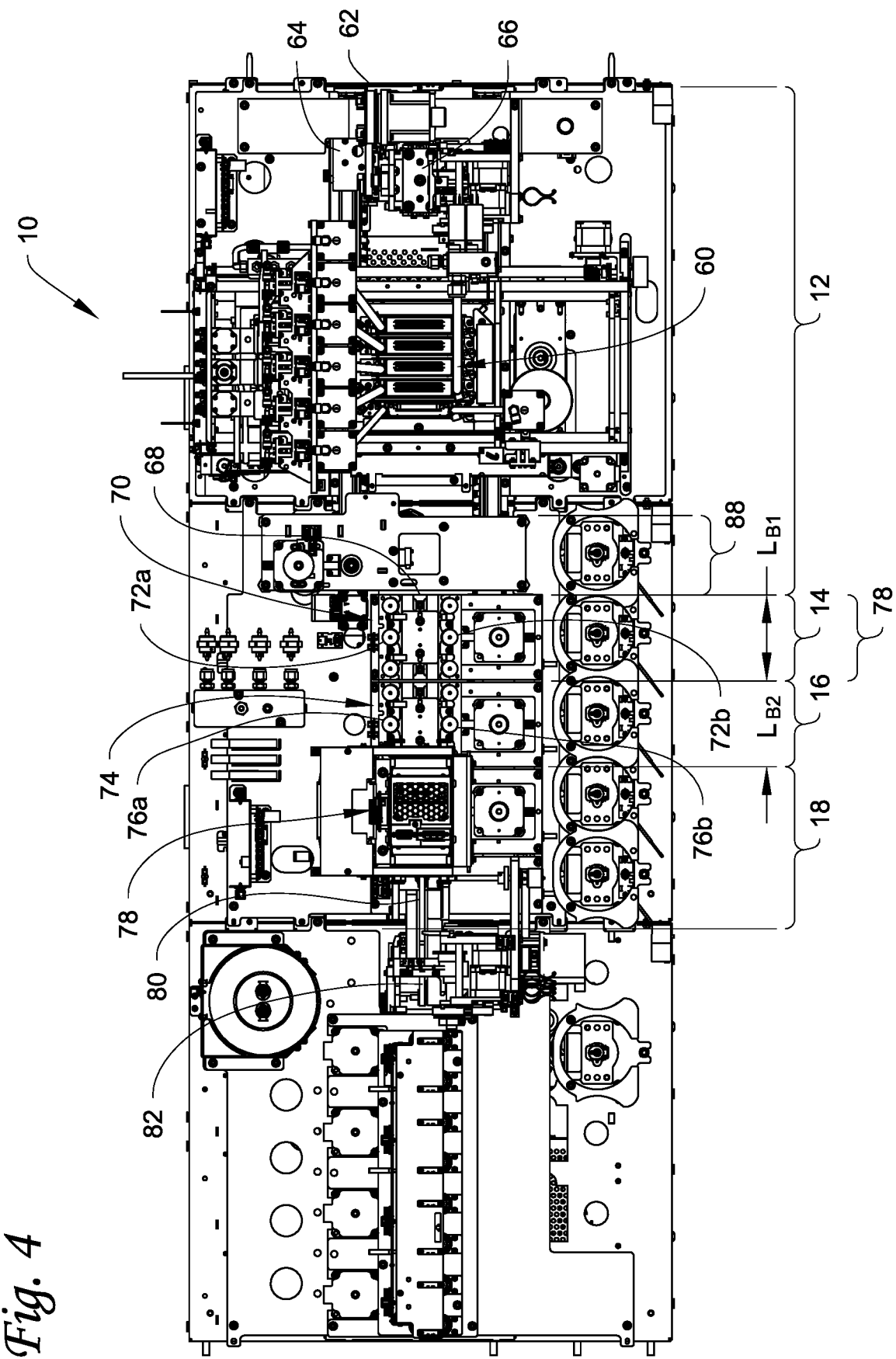
FIG. 4 is a top view of one example of a card processing system described herein.

Turning to FIG. 4, a specific example of the card processing system 10 from FIG. 1 is illustrated. For sake of convenience, the controller 22 and the logic controls 24, 26 of FIG. 1 are not shown in FIG. 4. In the example in FIG. 4, the card processing mechanism 12 is illustrated as including a DOD inkjet printer that prints using UV curable ink. The inkjet printer can have a single printhead that prints a single color, or as illustrated can include a plurality of printheads 60 to print multiple colors on the cards. Cards enter the card processing mechanism 12 via a card input 62. In this example, each card enters the card input 12 in a vertical orientation (i.e. the plane of the card extends vertically into and out of the paper as seen from the top view in FIG. 4) and each card is then rotated to a horizontal orientation via a suitable rotation mechanism 64 known in the art. The cards are transported by a mechanical card transport mechanism 66 in the horizontal orientation while in the card processing mechanism 12. The card transport mechanism 66 transports a card past the printhead(s) 60 of the inkjet printer for printing on the card, and then transports the card to a card output 68. An example of the card transport mechanism 66 that can be used is described in U.S. Patent Application Publication No. 2018/0326763.

Still referring to FIG. 4, the first card buffer 14 is located immediately adjacent to the card processing mechanism 12 at the card output 68. The card that is discharged through the card output 68 enters the first card buffer 14 where the card is received by the card transport mechanism 70 of the card buffer 14 with the card remaining in the horizontal orientation. In the example illustrated in FIG. 4, the card transport mechanism 70 comprises a series of transport rollers 72a, 72b disposed on opposite sides of the card transport path and that engage side edges of the card to transport the card in the card transport direction. The first card buffer 14 has a length $L_{B1}$ that is slightly greater than the length $L_C$ of the card (seen in FIG. 6) whereby only one card at a time can be accommodated in the card buffer 14.

Still referring to FIG. 4, the second card buffer 16 is located immediately adjacent to the first card buffer 14 at an output of the first card buffer 14. The card that is discharged through the card output of the first card buffer 14 enters the second card buffer 16 where the card is received by a card transport mechanism 74 of the card buffer 16 with the card remaining in the horizontal orientation. The second card buffer 16 can be similar in construction to the first card buffer 14, in that the card transport mechanism 74 of the second card buffer 16 comprises a series of transport rollers 76a, 76b disposed on opposite sides of the card transport path and that engage side edges of the card to transport the card in the card transport direction. The second card buffer 16 can have a length $L_{B2}$ that is identical to the length $L_{B1}$ of the first card buffer 14 and slightly greater than the length $L_C$ of the card (seen in FIG. 6) whereby only one card at a time can be accommodated in the card buffer 16.

Still referring to FIG. 4, the second card processing mechanism 18 is illustrated as including a UV curing station 78 that cures UV ink applied to the card. The UV curing station 78 includes a UV lamp (not shown) that applies UV radiation to the card to cure the UV ink. The second card processing mechanism 18 is located immediately adjacent to the second card buffer 16 at an output of the second card buffer 16. The card that is discharged through the card output of the second card buffer 16 is received by the card transport mechanism 80 of the second card processing mechanism 18 with the card remaining in the horizontal orientation. The DOD inkjet printer used in the card processing mechanism 12 and the UV curing station 78 of the card processing mechanism 18 can be conventional mechanisms well known in the art. An example of a DOD inkjet printer and a UV curing station in a card printing system is the Persomaster card personalization system available from Atlantic Zeiser GmbH of Emmingen, Germany.

After curing, the card is transported to a rotation mechanism 82 which rotates the card back to a vertical orientation for further processing downstream of the second card processing mechanism 18 or the card can be directed into an output hopper. The rotation mechanism 82 can be similar in construction and operation to the rotation mechanism 64 described above.

Example Implementation

For this example, it is assumed that each of the first card processing mechanism 12, the first card buffer 14, the second card buffer 16 and the second card processing mechanism 18 is considered a logical subsection that are each separately logically controlled, with each logical subsection having its own card transport mechanism. In addition, it is assumed that the first card processing mechanism 12 includes the DOD inkjet printer that prints UV curable ink, and that the second card processing mechanism 18 includes the UV curing station. For this example, each subsection is assumed to be capable of processing cards at a processing rate of 4000 cards/hour (0.90 seconds/card), with the system having an overall processing rate of 4000 cards/hour.

After the card has been printed by the DOD inkjet printer, the transport mechanism of the processing mechanism 12 transfers the card to the first card buffer 14 with the card remaining in the card buffer 14 for a predetermined amount of time. At the end of that predetermined amount of time, the card is then transferred to the second card buffer 16 where the card remains for another predetermined amount of time. At the end of that predetermined amount of time, the card is then transferred to the second card processing mechanism 18 and the UV curing station 78. The predetermined amounts of time that the card waits in the card buffers 14, 16 can be the same or different than one another. In addition, the predetermined amounts of time can be changed using the logic controls 24, 26 to adjust the delay times to desired amounts. The system will determine how much time each card will spend in each card buffer 14, 16 based on factors such as the desired cure delay time and the system card throughput.

For example:

Assume a desired card throughput is =4000 cards/hour=0.90 seconds/card.

Assume the desired cure delay time=2.00 seconds.

Assume there is a fixed enter/exit time=0.20 seconds. Enter/exit time refers to the total approximate time that it takes for a card to enter each mechanism or card buffer (approximately 0.1 seconds) and to exit each mechanism or card buffer (approximately 0.1 seconds).

Based on these assumptions, the number of card buffers to be used is determined by =(Cure Delay−Fix Enter/Exit Time)/System throughput=(2.00−0.20)/0.90=2 card buffers.

Both card buffers 14, 16 can be used independently as illustrated, or they can be combined into a single card buffer. When the two card buffers 14, 16 are used independently, the system can achieve a cure delay time of approximately 2.0 seconds at a processing rate of about 4000 cards per hour. The time spent in each card buffer is dependent on, for example, the desired card processing rate measured in cards per hour.

Referring back to FIG. 4, if the cure delay time needs to be increased, for example to between about 2 to about 3 seconds, an exit portion 88 of the card transport mechanism of the first card processing mechanism 12 could be used as an additional card buffer similar to the construction illustrated in FIG. 3. This could be achieved without making any mechanical changes to the system 10, but would reduce the card throughput, for example to about 3500 cards/hour, of the system 10. Alternatively, an additional card buffer(s) similar in construction to the card buffers 14, 16 could be added between the first card processing mechanism 12 and the second card processing mechanism 18.

In addition, if a shorter cure delay time is desired, for example a cure delay time between about 0.20 to about 0.45 seconds, the exit portion 88 of the card transport mechanism of the first card processing mechanism 12 could act as a card buffer and the UV curing station 78 (or a separate UV curing station) could be moved to the location of and replace the card buffer 14 as indicated in FIG. 4. In this embodiment, the second buffer 16 and the second card processing mechanism 18 could be removed.

Figure 5:
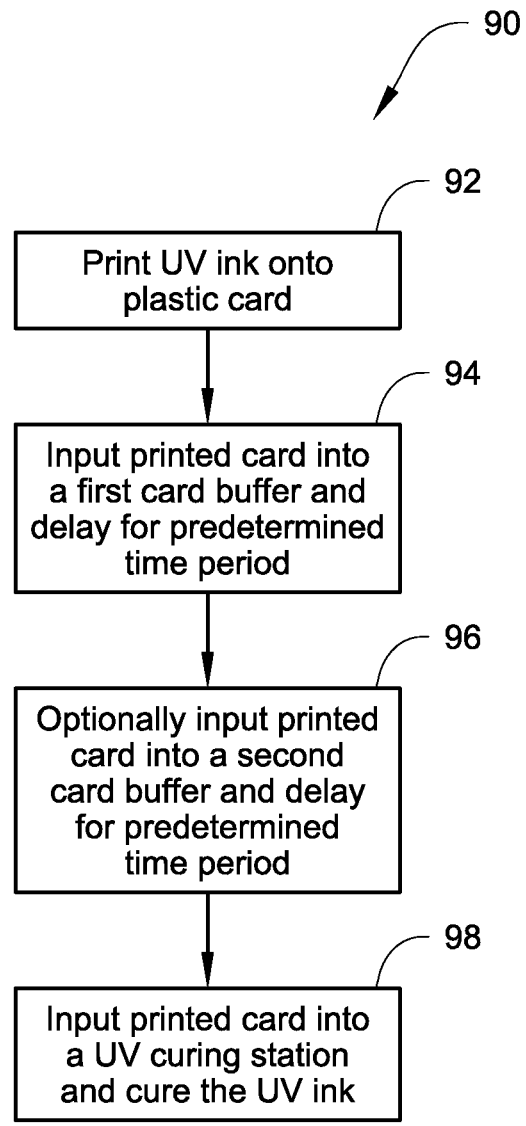
FIG. 5 illustrates an example card printing method described herein.

FIG. 5 illustrates a method 90 involving the example implementation of the system 10 where the first card processing mechanism 12 includes the DOD inkjet printer that prints UV curable ink, and that the second card processing mechanism 18 includes the UV curing station 78 as shown in FIG. 4. In the method 90, UV ink is printed onto a plastic card in a step 92 using the DOD inkjet printer. After printing, in step 94 the printed card is then input into a first card buffer (such as the card buffer 14) and the printed card is held in the card buffer for a predetermined period of time. At the end of the predetermined period of time, in step 96, the printed card can then optionally be input into a second card buffer (such as the card buffer 16) and the printed card is held in the second card buffer for another predetermined period of time. Alternatively, if the second delay provided by the second card buffer is not required, the printed card can be transported immediately through the second card buffer to the UV curing station. In step 98, the printed card is then input into the UV curing station and the UV ink is cured. The card can then be output from the UV curing station for further processing or output to an output hopper.

In the described systems and methods, the buffer time(s) of the card buffer(s) can be changed without mechanically adjusting a physical distance between the first and second card processing mechanisms 12, 18. Therefore, the cure delay time (i.e. the amount of time a card spends in the card buffer(s)) can be adjusted without having a significant impact on the card throughput rate. For example, the card transport mechanisms of the card buffer(s) can be controlled so that each card can basically pass through the card buffer(s) without stopping. Alternatively, the card transport mechanism of the card buffer(s) can be controlled so that each card can be temporarily stopped or "parked" in the card buffer(s) for a predetermined time period before being transported downstream. For example, the buffer time(s) can be changed at a desired point during a single card production run where the buffer time for a first card in the card production run can be different than the buffer time for a second card in the card production run. The second buffer time of the second card can be greater than or less than the first buffer time of the first card in that single card production run. In the past, if a buffer time needed to be changed to achieve the optimum cure delay time during a card production run, the card production run would be terminated (or at the least interrupted) and the distance between the print head(s) and the UV curing station mechanically adjusted. However, interrupting operation of the system in this manner significantly decreases the card throughput rate.

The systems and mechanisms described herein can be part of a central issuance card system that is often room sized, configured with multiple personalization/processing stations or modules simultaneously performing different personalization/processing tasks on cards, and that is generally configured to process multiple cards at once in relatively high processing volumes (for example, on the order of hundreds or thousands per hour). An example of a central issuance system is the MX and MPR line of card issuance systems available from Entrust Datacard Corporation of Shakopee, Minn. Central issuance systems are described in U.S. Pat. Nos. 6,902,107, 5,588,763, 5,451,037, and 5,266,781 which are incorporated by reference herein in their entirety.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A card processing system, comprising:
   a first card processing mechanism that is configured to perform a processing operation on a plastic card, the first card processing mechanism includes a first mechanical card transport mechanism that is configured to transport plastic cards along a first card travel path through the first card processing mechanism;
   a second card processing mechanism that is configured to perform a processing operation on a plastic card, the second card processing mechanism is located downstream of the first card processing mechanism and includes a second mechanical card transport mechanism that is configured to transport plastic cards along a second card travel path through the second card processing mechanism; and
   first and second card buffers disposed between the first card processing mechanism and the second card processing mechanism, each of the first and second card buffers includes a mechanical card transport mechanism that is configured to transport a plastic card along a card travel path, the mechanical card transport mechanism of the first card buffer is independently logically controlled from the mechanical card transport mechanism of the second card buffer.

2. The card processing system of claim 1, wherein the first card processing mechanism is a drop-on-demand printer that prints with ultra-violet (UV) curable ink, and the second card processing mechanism is a UV curing station that contains a UV lamp.

3. The card processing system of claim 2, wherein the drop-on-demand printer includes at least one printhead and a transport section located between the at least one printhead and a card exit of the first card processing mechanism, and the transport section is controlled to act as a card buffer.

4. The card processing system of claim 2, wherein the first card buffer is part of the first card processing mechanism.

5. The card processing system of claim 1, wherein the card travel paths of the first and second card buffers are colinear with each other and are colinear with the first card travel path and the second card travel path.

6. The card processing system of claim 1, wherein each of the first and second card buffers are configured to contain a single plastic card at any moment in time during operation.

7. The card processing system of claim 1, wherein each of the first card processing mechanism and the second card processing mechanism has a card processing rate, and a time that a plastic card spends in each of the first and second card buffers is adjustable.

8. The card processing system of claim 1, wherein the first and second card buffers are independent and separately logically controlled from one another, whereby a first plastic card traveling through the first and second card buffers has a first buffer time, and a second plastic card that follows the first plastic card in sequence and that travels through the first and second card buffers has a second buffer time, and the second buffer time is greater than or less than the first buffer time.

9. A card processing system, comprising:
a drop-on-demand printer that prints with ultra-violet (UV) curable ink, the drop-on-demand printer includes a mechanical card transport mechanism that transports plastic cards along a card travel path through the drop-on-demand printer;
a UV curing station that contains a UV lamp, the UV curing station is located downstream of the drop-on-demand printer and includes a mechanical card transport mechanism that transports plastic cards along a card travel path through the UV curing station;
at least one card buffer disposed between the drop-on-demand printer and the UV curing station, the at least one card buffer includes a mechanical card transport mechanism that transports a plastic card along a card travel path, the card travel path of the at least one card buffer is colinear with the card travel path through the drop-on-demand printer and colinear with the card travel path through the UV curing station, the at least one card buffer is configured to contain a single plastic card at any moment in time during operation.

10. The card processing system of claim 9, comprising at least two of the card buffers disposed between the drop-on-demand printer and the UV curing station.

11. The card processing system of claim 9, wherein the at least one card buffer is part of the drop-on-demand printer.

12. The card processing system of claim 9, wherein the drop-on-demand printer and the UV curing station each has a card processing rate, and a time that the card spends in the at least one card buffer is adjustable.

* * * * *